Nov. 11, 1930. E. G. STILL Re. 17,868
AIRCRAFT DEVICE
Original Filed March 8, 1924
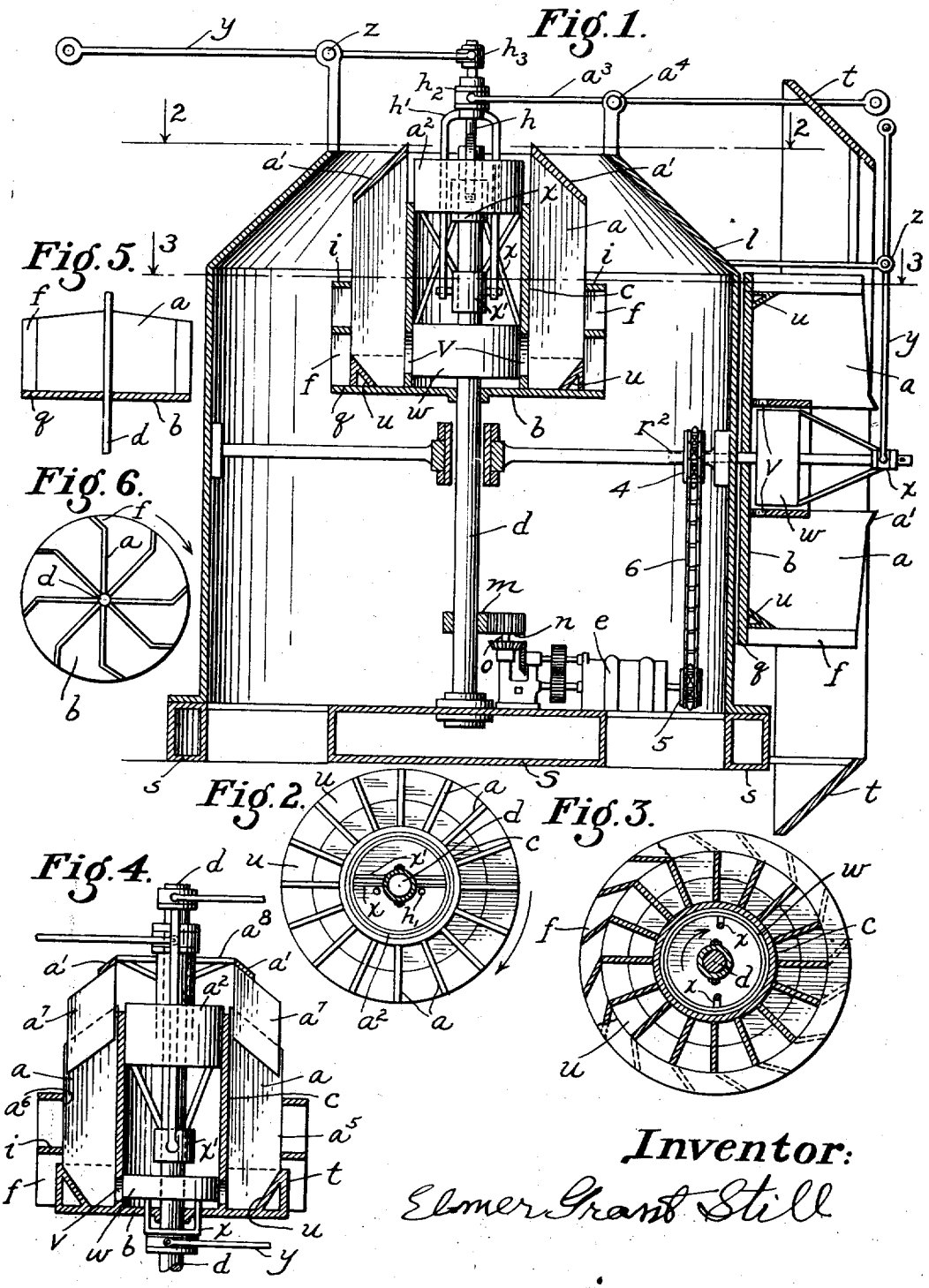
Inventor:
Elmer Grant Still Reissued Nov. 11, 1930

Re. 17,868

UNITED STATES PATENT OFFICE

ELMER GRANT STILL, OF LIVERMORE, CALIFORNIA

AIRCRAFT DEVICE

Original No. 1,634,239, dated June 28, 1927, Serial No. 697,953, filed March 8, 1924. Application for reissue filed March 13, 1928. Serial No. 261,367.

My invention relates to improvements in aircraft devices in which rotating radial vanes are used for the purpose of creating a partial vacuum on a surface by virtue of centrifugal force, and the objects of my invention are: to provide a simple efficient and comparatively small and light-weight device for lifting and propelling aircraft; to attain bird efficiency in flight (it having been found by experiment that many birds lift at the rate of between 100 and 200 pounds per horse-power used, while airplanes lift only about 20 and helicopters about 40 pounds per horse-power); to produce a "still flyer," or device that will stand still while flying, or hover in the air, and arise and alight perpendicularly; to provide a propelling and lifting device that (contrariwise to the screw propeller) will be more efficient at high than at low speeds of revolution and will have as much lifting power per horse-power when hovering as when moving forward (relative to the air); to provide an efficient propelling and lifting device having no regular working parts to wear out and get out of order; to make aircraft practically self-balancing, to reduce the dangers of flying to a minimum, and other objects hereinafter mentioned.

I attain these objects by the mechanism illustrated in the accompanying drawings, in which—

Fig. 1 is a view, in central vertical section, of one form of the device; Fig. 2, a plan view of the top of the principal revolving part of the device on the line 2—2 and minus the hollow frustum; Fig. 3, a cross section of the lower half of the principal revolving parts of the device on a level with the upper circular rims *i*, (the line 3—3); Fig. 4, a view, in central vertical section, of another form of the device; Fig. 5, a central sectional view of a less efficient form of the device; Fig. 6, a top plan view of the same.

Similar letters refer to similar parts throughout the several views.

In the preferred form of the device, the improvement over previous aircraft device attempting to use this principle of centrifugal force to create a thrust-giving partial vacuum on a surface by means of rotating radial vanes, consists in the downwardly-rushing air being prevented from striking tops of vanes in entering the spaces between the vanes at the top, which would thus produce considerable downward pressure; also, in means (a central cylinder or equivalent obstruction or projection), being provided to prevent the air in entering the body of the device, or spaces between the vanes, from entering closely around the central axis, where the centrifugal force is very small comparatively; also, in means being provided whereby the air enters the spaces between the vanes practically entirely or mainly from toward the central axis; also, in means being provided for regulating the degree of the lift-giving or thrust-giving partial vacuum during the operation of the device without changing the speed of revolution; also, in the centripetal back flow of the air toward the partial vacuum being prevented, thus conserving and increasing the partial vacuum; also, in means being provided for regulating during the operation of the device the effective height of the revolving radial vanes and also of the central cylinder; also, in the thrown-out air being deflected axially downward or backward by means of surrounding inclined, or sloping, surfaces, thus yielding additional lift or forward thrust, respectively; also, in the device being more strongly built and braced by reason of its structural arrangement, and other improvements hereinafter explained. However, not all these improvements (even only a few of them) designed for the preferred form of the device need necessarily be embodied in the device, which would then simply be not quite so efficient.

In order to accomplish the objects of my invention, I make use of centrifugal force, by means of thin radial vanes *a*, preferably (though not necessarily) taller than wide, which (in the preferred form of the device and when used for lifting instead of forward propulsion) are mounted vertically on a horizontal disc, or circular or symmetrical base, *b* the union being air-tight and these vanes extending from the periphery of the disc to about half-way to its center, where they are attached air-tightly to a vertical cylinder $c$, mounted centrally and air-tightly on said disc, and these vanes sloping off (in an angle or curve) at their tops, the slope being downward and away from center (that is, toward the periphery of said disc, or circular or symmetrical base), and the tops of these vanes preferably extending further from said disc than does said cylinder and preferably being covered entirely or partly with a sloping roof, or hollow frustum $a^1$, preferably attached to the tops of these vanes $a$.

The rapid revolution of the disc $b$, with its mountings, on its central vertical axis $d$ (to which it is attached) by the engine $e$, (through its drive shaft $o$, on which is fastened the gear $n$, meshing with the gear $m$ on the axis $d$,) causes the air to enter the openings at the inner edges of the vanes $a$ near their tops and be thrown out radially by centrifugal force; the air being thus thrown out radially the distance of the width of the vanes (say, one foot) before it, or much of it, can find its way downward for the distance of, say, four feet, representing the height of the vertical vanes.

The result is the production of a partial vacuum just above the top side of the horizontal disc $b$ (excepting, of course, the part covered by the central cylinder $c$); and if one-twentieth of a complete vacuum were thus produced there, the resulting lifting force would be 1/20 of 14.7 pounds (the air pressure per square inch at sea level) times 144 (the number of square inches in a square foot) times 9.4248 (the number of square feet in a 4-foot disc minus 1/4 for the area of the bottom of the 2-foot central cylinder $c$), which gives 997.52 pounds lift.

In the preferred forms of the device, as shown in Figs. 1 and 4 (and when the device is arranged vertically, i. e., for lifting), there is no head resistance (or downward pressure) at the top of the vertical vanes resulting from the air rushing rapidly downward there and striking these tops during the rapid revolution of the device, owing to the fact that the air enters the spaces between the vanes practically entirely from toward center (horizontally or approximately so) and thus strikes the inner vertical or nearly vertical edges of the vanes $a$ or $a^1$ near their tops, instead of entering at the horizontal open tops of the vanes (vertically, or axially), as in previous devices of this kind.

Another advantage of the air entering the spaces between the vanes from toward center is that it is not forced to change direction suddenly at right angles, as it is when entering axially, which wastes power and results in more air reaching the partial vacuum on the base.

Furthermore, the air, upon entering horizontally or somewhat downwardly from toward center would quickly be thrown by centrifugal force against the under side of the hollow frustum, or roof, $a^1$, thus maintaining an air pressure there at least equal to, if not greater than, the atmospheric pressure on the upper side of this roof, and in the latter case producing additional lift by reason of the pressure being greater on the under side.

In the form of the device shown in Fig. 1, a cylinder $a^2$ (Figs. 1 and 2) fits within the upper part of the central cylinder $c$ and has a framework $x^1$ attached to it and extending downward and fitting around the central shaft $d$ as a sleeve, and a lever $a^3$ pivoted at $a^4$, is connected with said framework by means of the double rods $h^1$ and their attached collar $h^2$, for operating said cylinder $a^2$ up and down as desired during the operation of the device and thus varying the effective height of the central cylinder and regulating (in conjunction with the roof $a^1$) the size of the openings through which the air rushes in near the top of the device and hence making it possible to regulate the amount of air coming into the device during its operation, as found best for different elevations, barometric pressures, speeds of revolution and other varying conditions of operation, and in order to admit sufficient air at all times to maintain at least atomspheric pressure on the under side of the roof $a^1$ equal to that on the top side.

These vertical vanes would be made numerous enough to give the air between them sufficient rotary and centrifugal motion and to add sufficient strength and rigidity to the device, in conjunction with the roof $a^1$.

It is a well-known fact that experiments made by M. Eiffel have proven that fully two-thirds of the lift of an airplane is due to the air-rarefaction, or negative air pressure, or partial vacuum, formed on the upper side of the planes; and this invention (as used by lifting) aims to devote the engine power to producing such a lift-giving partial vacuum by means of small, strong, light-weight device instead of using a large, fragile, heavy airplane or helicopter for the purpose.

Experiments have also shown that when thin surfaces, rather closely spaced, are moved very rapidly across the path of a very rapid air current (the latter parallel with these surfaces), the head resistance of their edges is considerable; and in fact when the space between the surfaces is reduced still more—even though each space is many times as great as the thickness of the surfaces—the head resistance encountered by the edges is nearly equal to that of a solid surface of the same area as that traversed by the surface edges; this being evidently due to the fact that practically every particle of the rapidly-flowing air is struck by the edges of the rapidly-moving surfaces.

By the mathematical rule for calculating centrifugal force, it is found that this force increases directly in proportion to the increase in the weight of the whirling body or particles and also increases directly in proportion to the increase in the distance from center (radius). Hence at 10 inches from center the centrifugal force is 10 times as great as at one inch from center. And it is also found by this rule that centrifugal force increases with the square of the speed of revolution when the other two variable factors (weight and radius) remain the same. Hence at 1000 revolutions per minute the centrifugal force is 100 times as great as at 100 revolutions per minute, instead of being only 10 times as great; and therefore a centrifugal flyer should be much more efficient at high than at low speeds of revolution, the power required increasing only directly with the increase in the speed of revolution, practically. Use is thus made of the principle that makes whirling winds, such as the tornado, so powerful, or efficient. This rule for calculating centrifugal force is as follows: Multiply the weight of the revolving body by the square of the velocity in feet per second (the velocity being found by multiplying the radius in feet by 2 and by 3.1416 and by the number of revolutions per second) and divide this product by the product found by multiplying the radius by 32.16 (gravity acceleration in feet per second).

If, instead of inserting the central cylinder *c*, the vanes were extended to the central shaft, as shown in Figs. 5 and 6, their movement close to center would be so slow (comparatively) that very little centrifugal force would be given to the air there to carry it outward, and hence considerable air would easily find its way quickly downward along the central axis and tend to destroy the partial vacuum at the top side of the horizontal disc *b*; while the extra air thus received into the device would have to be thrown out from around the axis indirectly by centrifugal suction, instead of directly by centrifugal force, and hence be thrown out less efficiently and less completely.

When used on aircraft for the purpose of forward propulsion, this device would, of course, have a horizontal position, as shown in Fig. 1, instead of being in a vertical position as shown elsewhere in the drawings.

To aid in maintaining the partial vacuum referred to, baffle plates *f f* are attached airtightly to the outer edges of the lower half (approximately) or more of each vertical vane or else between the edges of the vanes, these baffle plates extending vertically, preferably from an extension *q* of the disc *b*, and at a considerable angle to said vanes *a* and being preferably strengthened by circular rims, such as *i i*. These baffle plates assist in throwing the air out and, in the lifting forms of the device shown in the drawings, beat back the air which tends to rush inwardly (centripetally) there to fill the partial vacuum forming just above the top side of the disc *b*.

The engine *e* would preferably be a steam engine, so that engine failure would be practically impossible; and, owing to the greater lift per horse-power secured and the lighter weight of the device, it would be feasible to use heavier (and therefore stronger and more reliable) engines than those now used in aviation.

A hollow frustum of a cone *l* having an angle of about 45 degrees, is shown arranged around the upper part of the revolving device, preferably with vertical sides *r* below it, so as to throw the air currents downward as they strike it after being thrown outward by centrifugal force. This frustum would thus aid in securing further lift—or, in the case of a device of this kind arranged horizontally, as shown in Fig. 1 securing more thrust, or push—and together with the vertical walls *r*, would also prevent outside air currents (relative to the device) from interfering with the equilibrium of the device.

The outer part of the disc *b* may be provided with a circular, vertical strip *t*, or with a circular strip *u* sloping outward and upward (preferably at a steep angle), mounted airtightly on said disc, or with both such strips combined into one as shown, or with several of them spaced a distance apart. These would be a still further aid in maintaining the partial vacuum while the device is in action, by keeping the air from coming in at the bottom edge (centripetally) and by the sloping part *u* tending to throw upward and outward what little air does find its way to the bottom of the vanes.

Small holes *v* (Figs. 1 and 4), preferably vertical slots uniform for each vaned compartment, may be provided, preferably extending through the walls of the central cylinder *c* near the bottom thereof, together with a smaller cylinder *w* fitting tightly (airtightly) inside of the larger cylinder *c*, so that, by moving said inner cylinder upward, downward or around, the said slots will be partly or wholly uncovered, permitting outside air to rush into said compartments near the bottom during the operation of the device and thus doing away with the partial vacuum there to a greater or less extent, as desired, without decreasing the speed of revolution; the hollow cylinders *c* and *w* each being at least partly open at top or bottom or both. A framework *x* (Figs. 1, 2, and 3) extends upward from said inner cylinder *w* and around the driving shaft *d* as a sleeve sliding on it, and a lever *y*, pivoted at *z*, is connected with said framework by means of the double rod *h* (which becomes a single rod just above the central axis *d*) and its attached collar $h^3$, for operating said inner cylinder *w* up and down and thus varying the lifting force of the device as desired. This would be useful in enabling the device to rest on the ground with the engine running at full power, also to suddenly rise or drop in the air, to be suddenly checked in its downward movement, as in landing, and to land as gently as desired, all without changing the engine throttle.

The hollow frustum, or roof, $a^1$, may be attached to short radiating vanes $a^7$ and to a framework $a^8$ slidably mounted on the shaft $d$ near its top, with these short vanes $a^7$ overlapping the vanes $a$, all as shown in Fig. 4, so that by sliding this framework and attached parts up and down on the shaft the distance between the roof $a^1$ and the disc $b$ and hence effective height of the vanes may be varied during the revolution of the device and hence the amount of air intake varied accordingly (as well as by the cylinder $a^2$). This would be especially useful for experimental purposes, in order to determine the most efficient relative dimensions for the device.

This whole aviation device would preferably be built strongly of metal, such as welded sheet steel or duralumin or aluminum. It is shown mounted on floats $s$. By reason of the weight being mostly below the plane of lift, as shown, and outside air currents being prevented by the surrounding wall from interfering with the equilibrium of the device, as above explained, the device would be practically self-balancing, although means for lateral and longitudinal balancing could easily be added if desired. Preferably, small reversible-bladed propellers would be used for balancing and also for steering. Then, with a reliable steam engine, as above mentioned, it would make flying quite safe.

This device could be attached, as a part, to an airplane, dirigible, helicopter or other aircraft, either for lifting or propelling; or it could be used alone, like a captive balloon; or similar or other means for forward propulsion could be added to it; and several of these devices, revolving preferably in opposite directions or in balanced (symmetrical) relation (whether side by side or one above another), could be used on the same aircraft.

I do not restrict my invention to the preferred forms nor the precise form or relative dimensions herein given, for it is plain that variations (such as having the vanes not exactly perpendicular to the disc, or the vanes being somewhat curved or not being exactly radial but at an angle thereto) could be made from the specifications herein given without departing from the principle of the invention; a disc being "any plate or surface that is flat and circular or approximately so," as defined in the New Standard Dictionary, "centrifugal action" meaning the action of centrifugal force, and "more or less" being used in the usual sense of "approximately if not exactly."

Including such modifications and equivalents, I therefore claim:

1. In an aircraft device, a disc; a central axis; a plurality of practically radially disposed rotating vanes, the rotating vanes creating a partial vacuum on their side of said disc by centrifugal action, and means for regulating, during the operation of the device, the degree of the partial vacuum on said disc otherwise than by varying the speed of rotation of said vanes.

2. In an aircraft device, an axis; a more or less flat base; a plurality of practically radial rotating vanes located on said base, the revolution of said vanes on said axis producing a partial vacuum on said base, and means for regulating, during the operation of the device, the degree of the partial vacuum on said base otherwise than by varying the speed of rotation of said vanes.

3. In an aircraft device, an axis; a more or less flat base; a plurality of practically radial rotating vanes located on said base, the revolution of said vanes on said axis producing a partial vacuum on said base, and means for regulating, during the operation of the device, the degree of the partial vacuum on said base by admitting more or less air directly into said partial vacuum.

4. In an aircraft device, a more or less flat base; an axis; a plurality of practically radial rotating vanes located on said base, said vanes extending only part-way to said axis, so as to leave an open space around said axis, and being also otherwise of such shape and dimensions as to cause the entering air to enter the spaces between said vanes practically entirely from toward center instead of axially; the revolution of said vanes on said axis throwing the air out radially from openings between the outer ends of said vanes and thus producing a thrust-giving partial vacuum on said base.

5. In an aircraft device, in combination, a circular base, a central axis, a plurality of practically radial rotating vanes located on one side of said base and extending only part-way to said central axis, so as to leave an open space around said axis, the rotation of said vanes on said axis producing a useful, thrust-giving partial vacuum on said side of said base by centrifugal action, and an inclined surface surrounding the periphery of said vanes and serving to deflect axially the air thrown outward by said rotating vanes, thus producing additional useful thrust from said centrifugal air currents.

6. In a device for lifting or propelling aircraft, a more or less flat base; an axis; a plurality of practically radial rotating vanes located on said base, the rotation of said vanes on said axis creating a partial vacuum on said base by centrifugal action, and means for causing the entering air to enter the spaces between the said vanes practically entirely from toward said central axis during the operation of the device and to be discharged radially.

7. In a device for lifting or propelling aircraft, a more or less flat base; an axis; a plurality of practically radial rotating vanes located on said base, the rotation of said vanes on said axis creating a partial vacuum on said base by centrifugal action, and said vanes extending only part-way to said central axis and sloping at their ends opposite to said base (the slope being outward toward the periphery of said base), thus causing the entering air to enter the spaces between said vanes practically entirely from toward said central axis during the operation of the device.

8. In a device for lifting or propelling aircraft, a more or less flat base; an axis; a plurality of practically radial rotating vanes located on said base, the rotation of said vanes on said axis creating a partial vacuum on said base by centrifugal action, and said vanes extending only part-way to said central axis and sloping at their ends opposite to said base (the slope being outward toward the periphery of said base), and the air being discharged radially from openings between the outer ends of said vanes.

9. In a device for lifting or propelling aircraft, a more or less flat base; an axis; a plurality of practically radial rotating vanes located on said base, the rotation of said vanes on said axis creating a partial vacuum on said base by centrifugal action, and said vanes extending only part-way to said central axis and sloping at their ends opposite to said base (the slope being outward toward the periphery of said base); means for regulating, during the operation of the device, the degree of partial vacuum on said base otherwise than by varying the speed of rotation of said vanes, and an inclined surface surrounding the periphery of said vanes and serving to deflect axially the air thrown outward by said rotating vanes, thus producing additional useful thrust from said centrifugal air currents.

ELMER GRANT STILL.